United States Patent [19]

Sato et al.

[11] Patent Number: 4,753,515
[45] Date of Patent: Jun. 28, 1988

[54] METHOD FOR ASSEMBLING FLAT TYPE PLASTIC MULTIFIBER CONNECTORS

[75] Inventors: Hidemi Sato; Aizo Kaneda, both of Yokohama; Hitoshi Yokono, Katsuta; Kiichi Suzuki, Yokosuka, all of Japan

[73] Assignee: Hitachi Construction Machinery Co., Ltd., Tokyo, Japan

[21] Appl. No.: 870,172

[22] Filed: Jun. 2, 1986

Related U.S. Application Data

[63] Continuation of Ser. No. 780,237, Sep. 26, 1985, abandoned, which is a continuation of Ser. No. 551,909, Nov. 15, 1983, abandoned.

[30] Foreign Application Priority Data

Nov. 15, 1982 [JP] Japan ................................ 57-198942

[51] Int. Cl.$^4$ ............................................. B29D 11/00
[52] U.S. Cl. ..................................... 350/320; 264/1.5; 350/96.21; 350/96.22
[58] Field of Search ............... 350/96.20, 96.21, 96.22, 350/320; 264/1.5

[56] References Cited

U.S. PATENT DOCUMENTS

| | | | |
|---|---|---|---|
| 3,864,018 | 2/1975 | Miller | 350/96.21 |
| 4,029,390 | 6/1977 | Chinnock et al. | 350/96.22 |
| 4,265,514 | 5/1981 | Wellington et al. | 350/96.21 |
| 4,407,766 | 10/1983 | Haardt et al. | 264/2.2 |
| 4,475,790 | 10/1984 | Little | 350/96.21 |

FOREIGN PATENT DOCUMENTS

| | | | |
|---|---|---|---|
| 0005792 | 12/1979 | European Pat. Off. | 350/96.21 |
| 53-119059 | 10/1978 | Japan | 350/96.21 |
| 55-45051 | 3/1980 | Japan | 350/96.21 |

*Primary Examiner*—John Lee
*Attorney, Agent, or Firm*—Antonelli, Terry & Wands

[57] ABSTRACT

A connector means includes a connector housing provided with a plurality of bores which is defined by a pair of plastic bases each having a plurality of hemicycle grooves each of which has an inner diameter 1 to several μm larger than an outer diameter of each of the optical cables to be connected. After the optical fibres are inserted into the respective bores and secured therein, one end surface of the connector housing is polished. A pair of connected housings are retained so that the polished end surfaces abut on each other thereby to attain a connection between a plurality of optical cables.

2 Claims, 7 Drawing Sheets

METHOD FOR ASSEMBLING FLAT TYPE PLASTIC MULTIFIBER CONNECTORS

This is a continuation of application Ser. No. 780,237, filed Sept. 26, 1985, which is a continuation application of Ser. No. 551,909, filed Nov. 15, 1983, both abandoned.

BACKGROUND OF THE INVENTION

The present invention relates to a flat type connector means for splicing optical fibers to each other and, more particularly, to a flat type plastic connector means for enabling a simultaneous splicing of a plurality of optical fibers, and a method for assembing flat type connector means.

Optical fibers now have been replacing metal wire cables, since optical fibers are advantageously versatile, compact, lightweight, and free from any high-level electromagnetic interference. However, similarly to metal wire cables, an operation for splicing optical fibers to each other at a working site must be performed so that a splicing loss in a spliced portion will be sufficiently smaller than the total transmission loss in a fiber of a predetermined length.

In addition, it is required that the splicing portion on which optical fibers are connected to each other is easily formed, permanent, compact, lightweight and strong. In this case, above mentioned requirements except for the permanencey can be similarly applied to a connector for connecting a cable to a terminal device.

One widely employed splicing method includes a precision sleeve closely enclosing an outer periphery of a fiber to be connected, with the precision sleeve being used to guide and retain the fiber at a predetermined position. This method is most suitable for a single fiber or a cable having a small number of fibers, since it is necessary to individually handle the fibers.

With a large number of optical fibers, the fibers are retained and connected to each other between a metal or glass base having a plurality of grooves of a V-shaped cross-section formed on a surface thereof and a flat metal push plate. In this manner, an optical fiber constituted by a core and a cladding is retained in each groove by the flat push plate to form a connector. An axial end of the connector is to be ground. Optical fibers are connected to each other by abutting the ground ends of a pair of connectors to each other. In this case, the V-grooves are required to be machined with a strictly high accuracy in order to align the optical axes of optical fibers to be connected. Therefore, a considerable time is required for cutting such grooves and it is difficult to effect a mass production.

On the other hand, it has also been proposed to employ a silicon crystal base having a plurality of grooves of trapezoidal cross-section formed on a surface thereof by etching, instead of the cutting of a metal base. In this case, the dimensional accuracy of the cross-sectional configuration of the etched grooves is remarkably high, for example, ±1 μm. However, such a base is exceedingly expensive and brittle. Moreover, it has been proposed to employ a base having a plurality of grooves of V-shaped cross-section formed by plastic injection molding using a mold produced by electroforming using a silicon base as a master. However, with this proposed method, considerable amounts of time and cost are required for production of a mold by electroforming, disadvantageously.

Accordingly, it is an object of the invention to provide a connector means for splicing optical fibers and method of assembling the same which is relatively inexpensive to manufacture and which avoids the above-mentioned disadvantages of the prior art.

It is another object of the invention to provide a connector means and assembly method by which optical fibers are connected to each other easily and highly accurately.

The above and other objects, features and advantages of the invention will become clear from the following description of the preferred embodiments made in connection with the accompanying drawings.

BRIEF DESCRIPTION OF THE DRAWINGS

FIGS. 9 to 12 illustrate a process of formation of the housing half, in which FIGS. 9 to 11 are sectional views taken along the lines IX—IX and XI—XI of FIG. 10, respectively;

DETAILED DESCRIPTION

Figure 1:
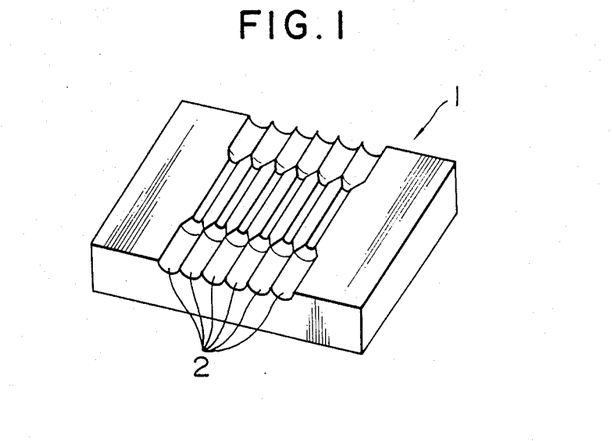
FIG. 1 is a half of a perspective view of a housing for connecting optical fibers constructed in accordance with the present invention.
Figure 2:
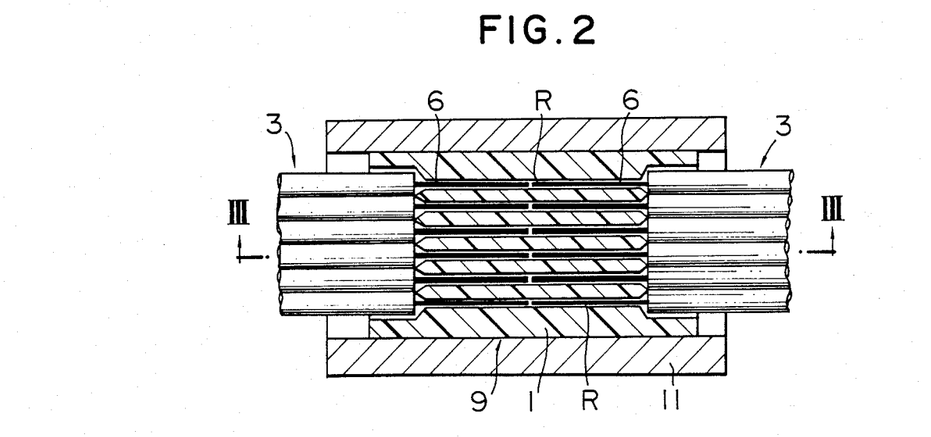
FIG. 2 is a sectional view of an embodiment of a connector constructed in accordance with the present invention taken along the line II—II of FIG. 3.
Figure 3:
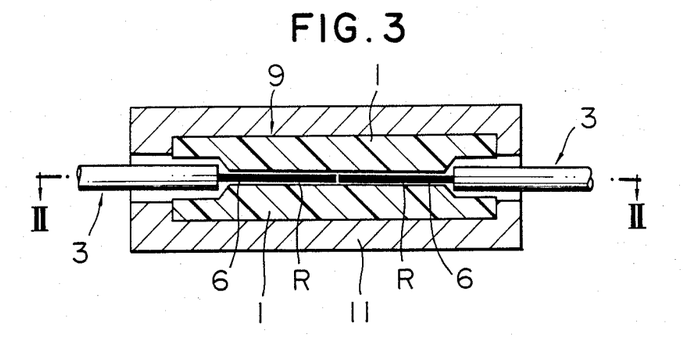
FIG. 3 is a sectional view taken along the line III—III of FIG. 2.
Figure 4:
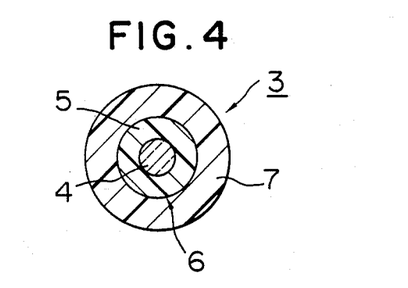
FIG. 4 is a schematic sectional view of an optical cable.
Figure 5:
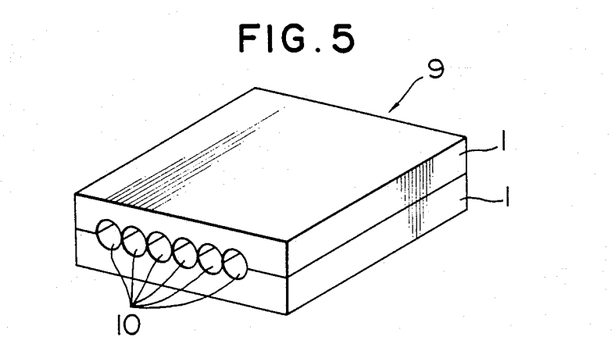
FIG. 5 is a perspective view of a connector housing.

Referring now to the drawings wherein like reference numerals are used throughout the various views to designate like parts and, more particularly, to FIG. 1, according to this figure, a plastic housing half generally designated by the reference numeral 1 for a connector of of the invention includes six grooves 2 each having two different hemispherical cross-sections are formed in one surface of the housing half 1. FIGS. 2 and 3 show the construction of an embodiment of the connector employing a pair of housing halves 1, 1. An optical cable generally designated by the reference numeral 3 generally includes an optical fiber 6 including a core portion 4 and a cladding 5 concentrically enclosing the core portion 4, and a protective sheathing 7 enclosing the optical fiber 6 (FIG. 4). The protective sheathing 7 is removed from the optical cable 3 at its connecting end portion which is to be mirror-cut or polished. A pair of housing halves 1, 1 are bonded to each other to form a housing 9 provided with six receiving bores 10 (FIG. 5), with a casing 11 being provided for accommodating the connector housing 9. The exposed optical fiber 6 is coated with a transparent epoxy bonding agent R having a coefficient of viscosity not larger than 20 poise and an index of refraction between 1.4 and 1.5. Then, each optical cable 3 is inserted into the respective bores 10. A similar bonding agent is employed for bonding between the pair of housing halves 1, 1. A pair of optical fibers 6 to be, in the illustrated embodiment, permanently connected to each other are secured to each other after their axes are aligned with each other in the bore 10.

Figure 6:
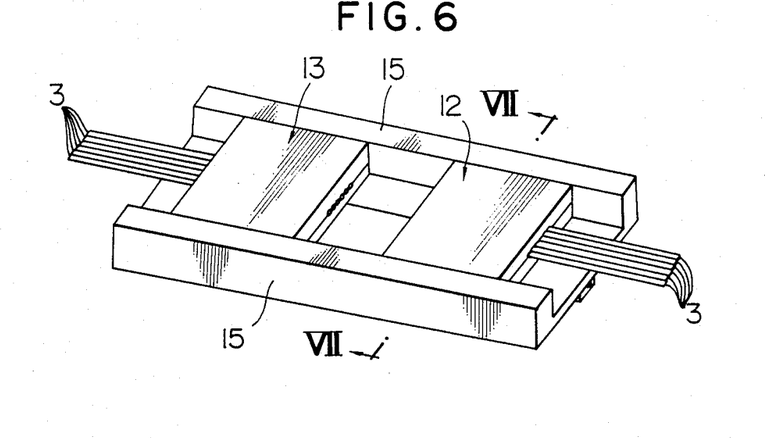
FIG. 6 is a perspective view of another embodiment of the connector in accordance with the invention, with the upper part thereof cut away.
Figure 7:
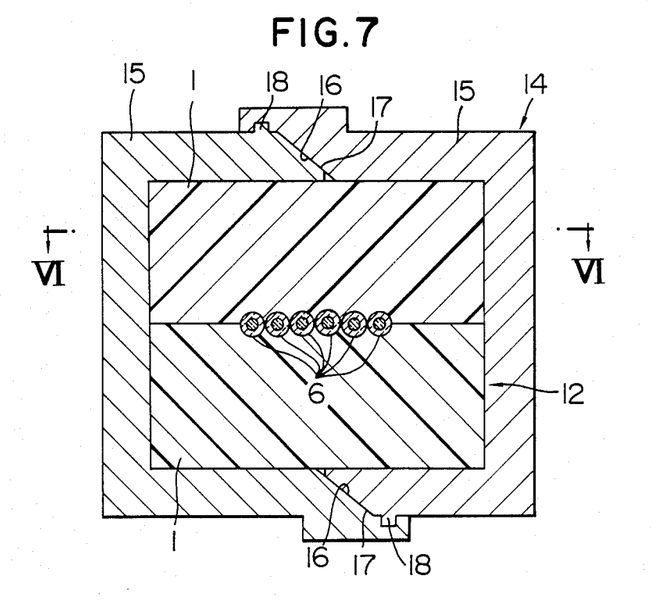
FIG. 7 is an enlarged schematic sectional view taken along the line VII—VII of FIG. 6.

With the embodiment of the connector of FIGS. 6 and 7, it is possible to detachably connect a pair of optical fibers 6 to each other. As with the above-described embodiment, a pair of connector housing halves 1, 1 are bonded to each other to provide a first housing 12 having six through bores 10. The optical fiber 6 of each optical cable 3 is inserted into the associated bore 10 and secured therein by a bonding agent. Moreover, a second housing 13 is provided in a similar manner. Not only one end surface of each housing 12 and 13 but the optical fibers 6 are polished together by an end polishing device (not shown) in a direction perpendicular to the axes of the optical fibers 6. Both housings 12, 13 are inserted into a casing 14 so that the polished end surfaces face each other. The polished end surfaces detachably abut each other to form a connection between a plurality of optical fibers 6. The casing 14 includes a pair of C-shaped channel members 15 one of which includes a recess 16 for complimentary engagement engaging with a slant 17 and a projection 18 formed on the other C-shaped channel member 15. Through the engagement between each recess 16 and the corresponding slant 17 and projection 18, the casing 14 is formed to firmly secure a pair of housings 12, 13.

Figure 8:
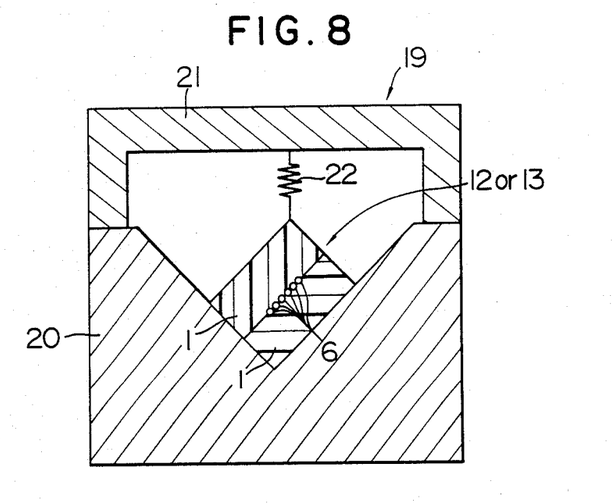
FIG. 8 is a sectional view of still another embodiment of the connector in accordance with the invention.
Figure 9:
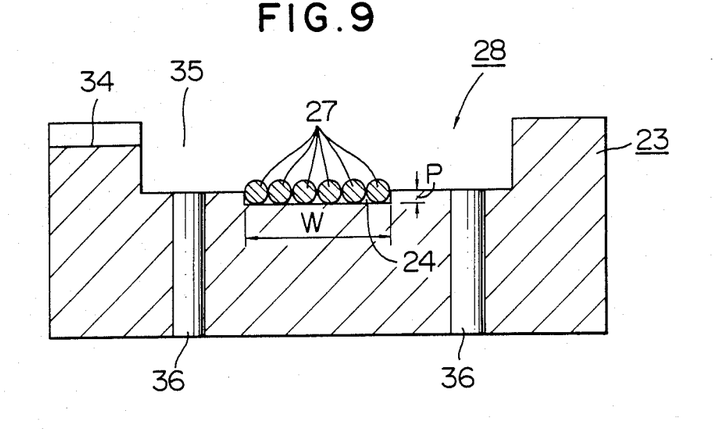

In the embodiment of FIG. 8, in place of the casing 14, a casing 19 is employed, which includes a base 20 having a groove of V-shaped cross-section and a press frame 21. The housing 12, 13 are pressed against the groove by a spring 22 attached to the press frame 21. The housing 12, 13 are brought into contact with each other by moving the press frame 21 whereby the housings are positioned stably and highly accurately.

It is also possible that after the sheathing 7 in one portion of each optical cable 3 is removed to expose an optical fiber 6 which is to be secured by a bonding agent in a housing 9 which holds the exposed optical fiber 6 between the pair of housing halves 1, the housing 9 is cut into two parts at a central portion thereof in a direction perpendicular to the axes of the optical fibers 6 and the cut surfaces are polished for use. In this manner, it is possible to employ only two housing halves rather than four housing halves as employed in the first two embodiments described hereinabove.

To manufacture the housing half 1, as shown in FIGS. 9-12, an outer diameter of each of the optical fibers to be connected is D μm, an outer diameter of each of the optical cables is LD μm, and the number of the optical fibres is n, with a groove 24, having a width $W=(n \times LD + n \times \alpha)$ μm and a depth $P=(LD+\alpha)/2$ μm, being formed in the opposite end portions of a mold 23. A series of six grooves 24', each having a width $w=(D+\alpha)$ μm and a depth $p=(D+\alpha)/2$ μm are formed in a central portion of the mold 23 so as to communicate the grooves 24, to form a mold cavity half for a columnar master 27. A retainer plate 25 is also provided with a groove 26 having the same configuration as that of the groove 24. The reference symbol α represents a constant determined according to the mold shrinkage factor of a plastic employed. The metal columnar masters 27, each of which has enlarged end portions, are disposed in the mold cavity half, and the retainer plate 25 is fitted in the mold 23, so that a cavity core 28 is extremely easily constituted. Although the columnar masters 27 and the groove 24 can be machined with an accuracy on the order of 0.2 to 0.5 μm by the conventional machining technique, the diameter of the columnar masters 27 may be 1 μm to several μm lager than the outer diameter D of optical fiber taking into consideration of the mold shrinkage of a plastic material.

Figure 12:
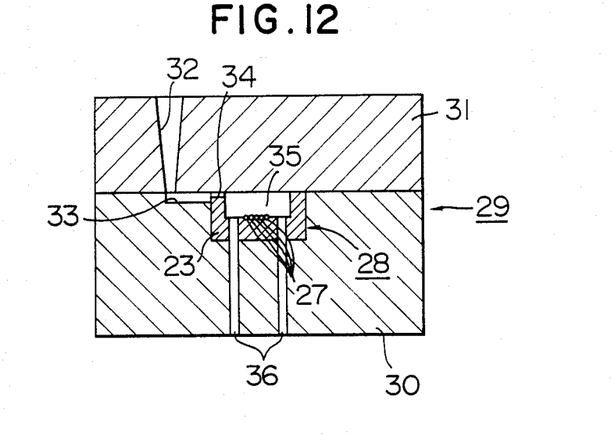

As shown in FIG. 12, mold 29 includes a lower half 30 having the cavity core 28 as an inner mold and an upper half 31. The mold 29 is clamped by a molding machine (not shown) and a plastic material is filled into a cavity 35 through a sprue 32, a runner 33 and a gate 34. After the filled plastic material cools and hardens, the lower, upper halves 30 and 31 are separated from each other, and the molding housing half 1 in the cavity 35 is pushed out of the mold 29 by ejector pins 36. In this case, if an epoxy resin or phenolic resin mixed with quartz powder, glass fiber, carbon fiber or the like as a filler is employed as the plastic material, the accuracy of the columnar masters 27 can be transferred virtually exactly.

Figure 10:
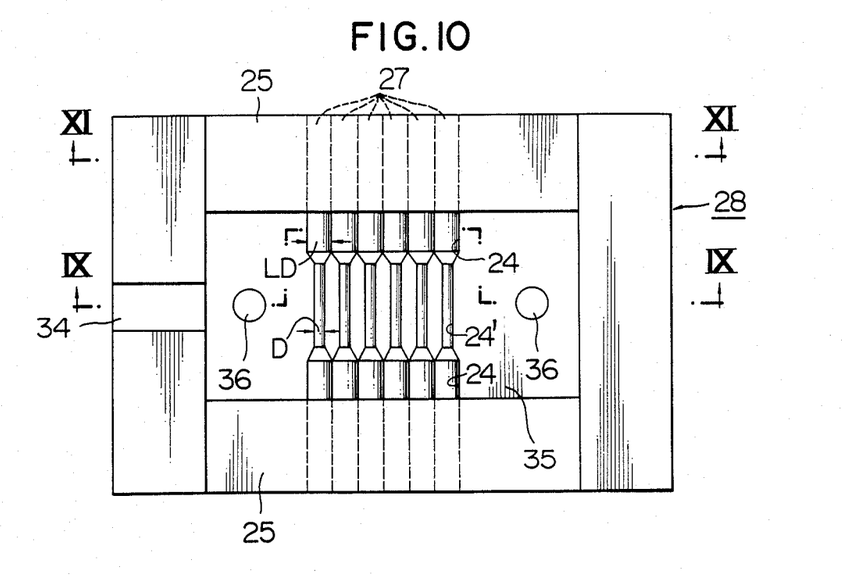
Figure 11:
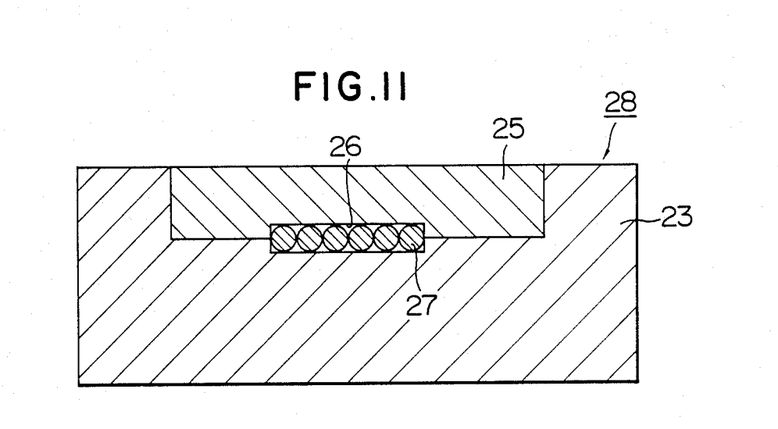

In the case where optical cables are permanently connected to each other as shown in FIG. 2, both end portions of the grooves in the housing half 1 are required to have a diameter larger than that of the sheathings of the optical cables so that the sheathings can be housed therein. Therefore, both end portions of each master 27 are required to have a diameter slightly larger than that of the sheathing as shown in FIG. 10. Moreover, in the case where optical cables are detachably connected to each other as shown in FIG. 13, since only one end portion of each of the grooves in the housing half 1 is required to have a diameter larger than that of the sheathing so that it can be housed, only one end portion of each master 27 is required to have a diameter slightly larger than that of the sheathing.

Figure 13:
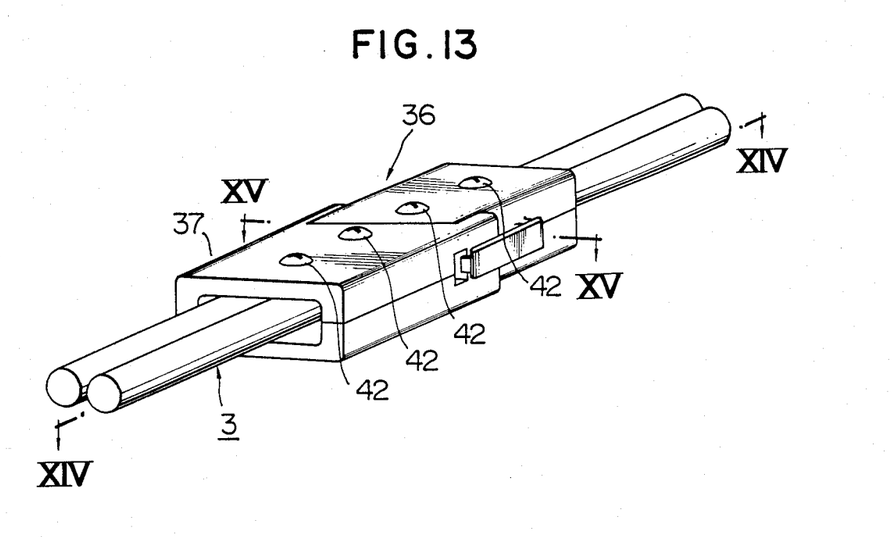
FIG. 13 is a perspective view of a further embodiment of the connector in accordance with the invention.
Figure 14:
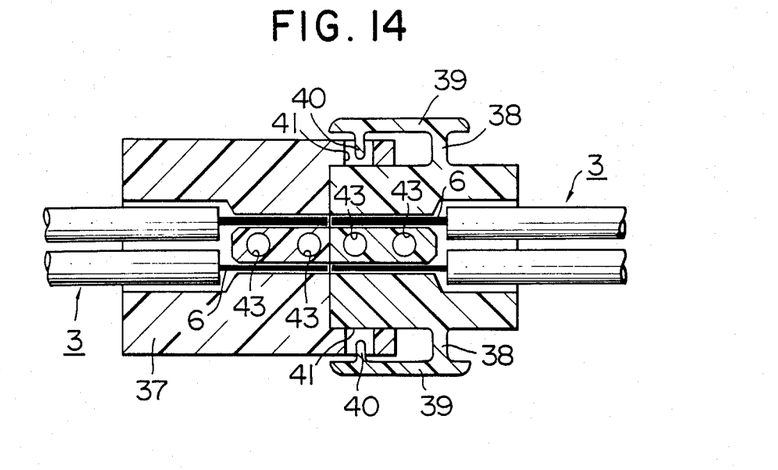
FIGS. 14 and 15 are sectional views taken along the lines XIV—XIV and XV—XV of FIG. 13, respectively.
Figure 15:
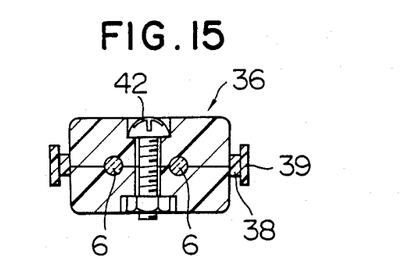

In FIGS. 13 to 15, housings 36, 37 themselves are provided with engaging means without employing the casings 14, 19. More specifically, one housing 36 has a pair of arms 39 with hooks 40 provided on both sides thereof through projections 38 having elasticity, respectively. The other housing 37 is provided on both sides thereof with recesses 41 for housing the hooks 40 thereby to connect both the housings 36 and 37. Each housing is assembled by tightening a pair of housing halves by screws 42, 42, and bores 43 are provided for respectively receiving the screws 42.

In accordance with the present invention, a flat type connector means can be manufactured with high efficiency and accuracy as well as a low cost by the plastics molding using a mold. In addition, since a plastic material mixed with quartz powder, glass fiber, carbon or the like as a filler is employed to make the linear expansion coefficient smaller, it is possible to reduce the dimensioned change due to temperature change. Accordingly, it is possible to provide an optical connector having a lower splicing loss as well as an excellent reliability.

What is claimed is:

1. A method for assembling flat type plastic connector means for a plurality of optical fibers, the method comprising the steps of:
   arranging a plurality of columnar metallic masters on a mold, with a diameter of each master being one to several μm larger than an outer diameter of the optical fibers to be connected to each other;

holding said columnar metallic masters stationary; injecting a thermo-setting resin into said mold to form plastic base halves, on one surface of which a plurality of hemicycle grooves are provided;

pushing said mold out of said plastic base halves with ejector pins;

bonding a pair of plastic base halves together into plastic bases so as to define a plurality of through bores therein;

bonding said optical fibers in said through bores respectively with a bonding agent so that said optical fibers extend through one end of one of said plastic bores;

polishing up the other end of said one of said plastic bases together with the bound optical fibers; and clamping a pair of plastic bases so that a polished end of one plastic base abuts a polished end of the other plastic base.

2. A method according to claim 1, wherein said thermo-setting resin is one of an epoxy or a phenolic resin both of which are mixed with at least one of quartz powder, glass fiber, carbon fiber, as a filler.

* * * * *